(12) United States Patent
Fenelon (10) Patent No.: US 7,812,983 B2
(45) Date of Patent: Oct. 12, 2010

(54) METHODS AND SYSTEMS FOR TRANSFERRING BINARY DATA

(75) Inventor: Michael P. Fenelon, Bothell, WA (US)

(73) Assignee: Microsoft Corporation, Redmond, WA (US)

(*) Notice: Subject to any disclaimer, the term of this patent is extended or adjusted under 35 U.S.C. 154(b) by 1117 days.

(21) Appl. No.: 11/090,264

(22) Filed: Mar. 25, 2005

(65) Prior Publication Data

US 2006/0215701 A1 Sep. 28, 2006

(51) Int. Cl.
*G06F 3/12* (2006.01)
*G06F 7/00* (2006.01)

(52) U.S. Cl. .................. 358/1.15; 707/100; 707/246

(58) Field of Classification Search ............. 358/1.15; 707/6, 10, 100, 101, 102; 709/246; 395/200.33; 370/466, 389, 401, 474, 395.5, 402
See application file for complete search history.

(56) References Cited

U.S. PATENT DOCUMENTS

| | | | |
|---|---|---|---|
| 5,937,160 A * | 8/1999 | Davis et al. ............. | 709/203 |
| 6,571,248 B1 * | 5/2003 | Kusama .................. | 1/1 |
| 6,810,429 B1 * | 10/2004 | Walsh et al. ............. | 709/246 |
| 7,089,248 B1 * | 8/2006 | King et al. .............. | 707/10 |
| 2002/0023654 A1 | 2/2002 | Webb | |
| 2003/0158961 A1 * | 8/2003 | Nomura et al. .......... | 709/237 |
| 2006/0288123 A1 * | 12/2006 | Vered .................... | 709/246 |

FOREIGN PATENT DOCUMENTS

EP 1361712 11/2003

OTHER PUBLICATIONS

Gudgin, et al. "XML-Binary Optimized Packaging", Jan. 25, 2005, 17 pages.*
XML-binary Optimized Packaging; W3C Recommendation Jan. 25, 2005; Gudgin et al.*
Vermeulen et al, "Software Agents using XML for Telecom Service Modelling: a Practical Experience", XML 98 Europe, Paris, Retrieved from the Internet on Nov. 10, 2005: <URL: http://www.infoloom.com/gcaconfs/WEB/paris98/bauwens.HTM>.

* cited by examiner

*Primary Examiner*—Benny Q Tieu
*Assistant Examiner*—Neil R McLean
(74) *Attorney, Agent, or Firm*—Lee & Hayes, PLLC (57) ABSTRACT

Various embodiments enable binary data to be included in its original form, along with XML control information, within the protocol used to transfer the data. In the illustrated and described embodiments, a data model is employed in which the binary data comprises part of a multi-part message that is divided with part delimiters.

20 Claims, 7 Drawing Sheets

Fig. 2

Boundary or Part Delimiter

```
MIME-Version: 1.0
Content-Type: multipart/related
type=application/xop+xml;
boundary="--=_NextPart_123_321_0000000.3E9F5D";
start="<OperationRequest>";
startInfo=application/soap+xml
```
202

```
----=_NextPart_123_321_0000000.3E9F5D
Content-Type: application/xop+xml; type=application/soap_xop+xml
                   charset=UTF-8
Content-Transfer-Encoding: binary
Content-ID:<OperationRequest>

<SOAP-ENV:Envelope xmlns:SOAP-ENV="http://schemas.xmlsoap.org/soap/envelope/"
    xmlns:SOAP-ENC="http://schemas.xmlsoap.org/soap/encoding/"
    xmlns:xsi="http://www.w3.org/2001/XMLSchema-instance"
    xmlns:xsd="http://www.w3.org/2001/XMLSchema"
    xmlns:nprt="http://schemas.microsoft.com/windows/2004/09/wdp/print">
<SOAP-ENV:Body>
    <nprt:SendDocumentRequest xmlns:nprt="http://schemas.microsoft.com/windows/2004/09/wdp/print">
        <nprt:JobId>1</nprt:JobId>
        <nprt:DocumentId>1</nprt:DocumentId>
        <nprt:Compression>None</nprt:Compression>
        <nprt:DocumentFormat>application/octet-stream</nprt:DocumentFormat>
        <nprt:DocumentName>Example.xml</nprt:DocumentName>
        <nprt:LastDocument>false</nprt:LastDocument>
        <nprt:DocumentData xop:mime:content-type="application/postscript">
            <xop:Include href="cid:000001"/>
        </nprt:DocumentData>
    </nprt:SendDocumentRequest>
</SOAP-ENV:Body>
</SOAP-ENV:Envelope>
```
204

```
----=_NextPart_123_321_0000000.3E9F5D
Content-Type: application/postscript;
Content-Transfer-Encoding: binary
Content-ID:<000001>

Document PDL Data
----=_NextPart_123_321_0000000.3E9F5D--
```
206

Fig. 3

```
<SOAP-ENV:Envelope xmlns:SOAP-ENV="http://schemas.xmlsoap.org/soap/envelope/"
    xmlns:SOAP-ENC="http://schemas.xmlsoap.org/soap/encoding/"
    xmlns:xsi="http://www.w3.org/2001/XMLSchema-instance"
    xmlns:xsd="http://www.w3.org/2001/XMLSchema"
    xmlns:nprt="http://schemas.microsoft.com/windows/2004/09/wdp/print">
    <SOAP-ENV:Body>
        <nprt:SendDocumentResponse xmlns:nprt="http://schemas.microsoft.com/windows/2004/09/wdp/print" />
    </SOAP-ENV:Body>
</SOAP-ENV:Envelope>
```

Fig. 4

```
<SOAP-ENV:Envelope xmlns:SOAP-ENV="http://schemas.xmlsoap.org/soap/envelope/"
    xmlns:SOAP-ENC="http://schemas.xmlsoap.org/soap/encoding/"
    xmlns:xsi="http://www.w3.org/2001/XMLSchema-instance"
    xmlns:xsd="http://www.w3.org/2001/XMLSchema"
    xmlns:nscn="http://schemas.microsoft.com/windows/2004/07/wdp/scan">
    <SOAP-ENV:Body>
        <nscn:InitiateScanRequest xmlns:nscn="http://schemas.microsoft.com/windows/2004/07/wdp/scan">
            <nscn:ScanIdentifier>Iduuid:12e7a983-1034-5428-d298-0016f11097fa</nscn:ScanIdentifier>
            <nscn:DestinationToken>Dest1234TokenString</nscn:DestinationToken>
            <nscn:ScanTicket>
                <nscn:JobName>Photo Scan</nscn:JobName>
                <nscn:JobOriginatingUserName>RogerSmith</nscn:JobOriginatingUserName>
                <nscn:JobTransferMode>Response</nscn:JobTransferMode>
                <nscn:DocumentFormat>Tiff-multi</nscn:DocumentFormat>
                <nscn:DocumentName>Scan001.jpg</nscn:DocumentName>
            </nscn:ScanTicket>
        </nscn:InitiateScanRequest>
    </SOAP-ENV:Body>
</SOAP-ENV:Envelope>
```

Fig. 5

```
MIME-Version: 1.0
Content-Type: multipart/related
type=application/xop+xml;
boundary="--=_NextPart_123_321_0000000.3E9F5D";
start="<ScanResponse>";
startinfo=application/soap+xml ----=_NextPart_123_321_0000000.3E9F5D
Content-Type: application/xop+xml; type=application/soap_xop+xml
               charset=UTF-8
Content-Transfer-Encoding: binary
Content-ID: <ScanResponse>

<SOAP-ENV:Envelope xmlns:SOAP-ENV="http://schemas.xmlsoap.org/soap/envelope/"
   xmlns:SOAP-ENC="http://schemas.xmlsoap.org/soap/encoding/"
   xmlns:xsi="http://www.w3.org/2001/XMLSchema-instance"
   xmlns:xsd="http://www.w3.org/2001/XMLSchema"
   xmlns:xop="http://www.w3.org/2003/12/xop/include"
   xmlns:xop-mime="http://www.w3.org/2003/12/xop/mime"
   xmlns:nscn="http://schemas.microsoft.com/windows/2004/07/wdp/scan">
<SOAP-ENV:Body>
   <nscn:InitiateScanResponse xmlns:nscn="http://schemas.microsoft.com/windows/2004/07/wdp/scan">
      <nscn:JobId>1</nscn:JobId>
      <nscn:ScanData xop-mime:content-type="application/image/jpeg">
         <xop:Include href="cid:000001" />
      </nscn:ScanData>
   </nscn:InitiateScanResponse>
</SOAP-ENV:Body>
</SOAP-ENV:Envelope>

----=_NextPart_123_321_0000000.3E9F5D
Content-Type: image/jpeg;
Content-Transfer-Encoding: binary
Content-ID: <000001>

Binary Scan Data
----=_NextPart_123_321_0000000.3E9F5D--
```

METHODS AND SYSTEMS FOR TRANSFERRING BINARY DATA

TECHNICAL FIELD

This invention relates to methods and systems for transferring binary data.

BACKGROUND

In most if not all previous web/http-based device protocols, there is not a way to easily and efficiently transfer large amounts of binary data within the overall protocol. It is possible, for example, to send binary data within an XML data stream, but doing this requires the binary data to be encoded, typically in a Base64Binary representation. Encoding in a Base64Binary representation has two main drawbacks which make its use in this regard inefficient. First, Base64Binary is an ASCII representation of binary data and, as such, the data doubles in size when encoded. Second, the computation time needed to encode and then later decode the Base64Binary makes data transfer in this manner is very inefficient.

One past attempt to transfer binary data performs some transfer setup that involves passing attributes of the data defined in XML within the context of the device protocol, and then sending the binary data in a separate HTTP connection that is outside the definition of the device protocol. This approach, however, gives rise to synchronization problems insofar as synchronizing certain aspects of the data with its attributes. In addition, this approach also creates a number of security and connection-related issues that can impact protocol design and device implementation of the protocols. Needless to say, this approach is not the best choice when one wishes to pass binary data in an efficient and safe manner.

Accordingly, this invention arose out of concerns associated with providing improved methods and systems for transferring binary data.

SUMMARY

Various embodiments enable binary data to be included in its original form, along with XML control information, within the protocol used to transfer the data. In the illustrated and described embodiments, a data model is employed in which the binary data comprises part of a multi-part message that is divided with part delimiters.

BRIEF DESCRIPTION OF THE DRAWINGS

FIG. 4 illustrates an exemplary response in accordance with one embodiment.

FIG. 5 illustrates an exemplary message in accordance with one embodiment.

DETAILED DESCRIPTION

Overview

Various embodiments described below enable binary data to be included in its original form, along with XML control information, within the protocol used to transfer the data. In the illustrated and described embodiments, a data model is employed in which the binary data comprises part of a multi-part message that is divided with part delimiters.

A first part of the message contains information that describes the structure and format of the message, the part delimiters, and provides information pertaining to the starting Content ID of the next message part.

Following a part delimiter, the next part of the message contains information that specifies the content or data type of the current message part, the transfer encoding and provides Content ID information that is referenced by the previous message part. Following this information, the message part contains data of the type defined for the message part and includes, in accordance with one embodiment, information that pertains to the Content ID of the next message part. In at least one embodiment, the data type that is employed in this message part is XML. The XML data can be used to provide contextual information about the binary data that is included in the message. This contextual information can comprise any suitable type of information. For example, the contextual information can describe the nature and content of the binary data, and/or it can provide instructions that pertain to how the binary data has been processed, how it should be processed, and the like.

Following another part delimiter, the next part of the message contains information that specifies the content or data type of the current message part, transfer encoding, and provides Content ID information that is referenced by the previous message part. Following the Content ID information, the binary data is provided followed by a part delimiter that indicates the end of the message.

Hence, the inventive data model enables non-binary XML arguments and attributes to be easily combined with large amounts of binary data, and for the whole message or package to be sent efficiently over a network to a network device. When HTTP is the transport protocol, the inventive data model can also remove the need for multiple HTTP connections and can thereby eliminate the need to set up more than one secured connection from a client to the receiving device. As such, protocol is much easier to implement for device vendors. In addition, the data model can greatly reduce the complexity of the client and device software/firmware, as will be appreciated by the skilled artisan.

Implementation Example

To provide some context for how the inventive data model can be employed, the following discussion focuses on one particular operating environment in which the data model can be advantageously employed. It is to be appreciated and understood that the description that follows is provided as an example to assist the reader in appreciating the utility of the data model. The description is not intended to limit application of the data model to any one particular operating environment. As such, the data model can be employed in other operating environments without departing from the spirit and scope of the claimed subject matter.

Figure 1:
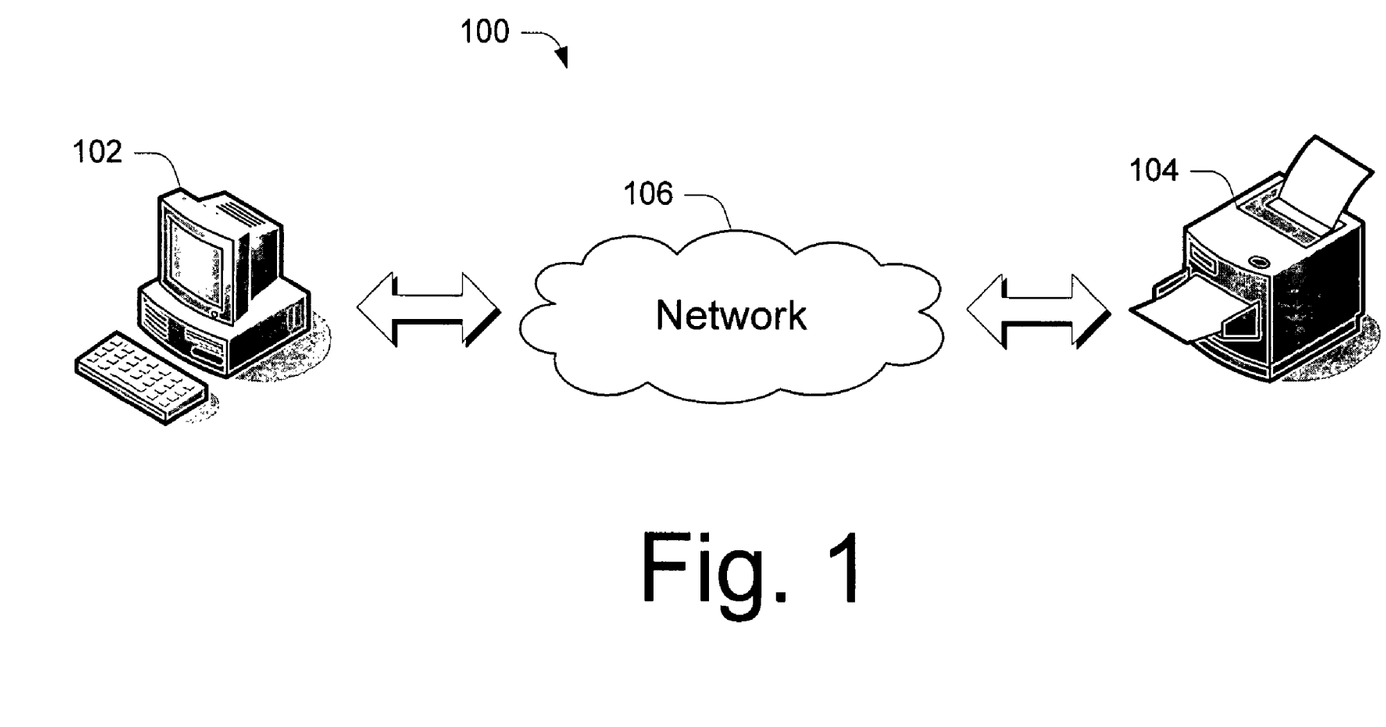
FIG. 1 shows an exemplary system in which the inventive principles can be implemented in accordance with one embodiment.

In the printing and scanning space, it is fairly typical to send large amounts of binary data from one device to another. For example, FIG. 1 shows a system 100 that includes a client device 102, a printer 104 and a network 106 communicatively connecting the device and printer. An application executing on client device 102 may send large print jobs to printer 104. Print jobs can and often do contain large amounts of binary data. As such, the inventive data model can be employed in this operating environment to provide efficient and safe data transfer.

Figure 2:
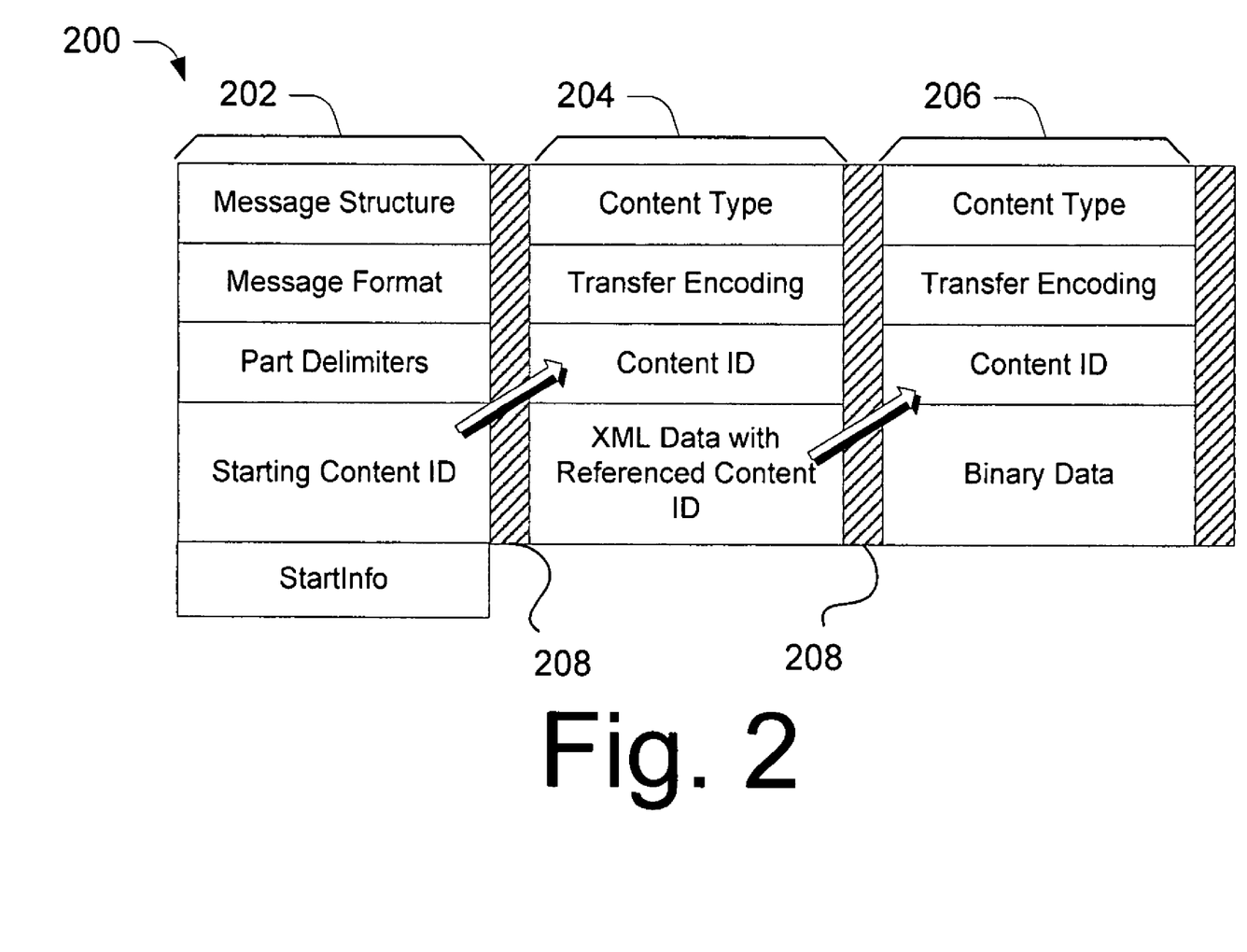
FIG. 2 illustrates an exemplary message in accordance with one embodiment.

As an example, consider FIG. 2 which illustrates an exemplary message in accordance with one embodiment, generally at 200. In this example, message 200 comprises multiple parts 202, 204 and 206 that are set off from one another by delimiters 208.

In this example, first part 202 includes information that pertains to the message's structure, message format, part delimiters and the starting Content ID that references, as indicated by the arrow, the Content ID for the next message part 204.

Message part 204 includes information that pertains to its content type, transfer encoding, its Content ID referenced by the previous message part, and XML data that includes a Content ID that references, as indicated by the arrow, the Content ID for the next message part 206.

Message part 206 includes information that pertains to its content type, transfer encoding, its Content ID referenced by the previous message part, and the binary data.

In accordance with one embodiment, message 200 is implemented as a MIME Multipart/Related request. The MIME Multipart/Related content-type provides a mechanism for representing objects that are aggregates of related MIME body parts, as will be appreciated by the skilled artisan. Accordingly, in the FIG. 2 example, message part 202 is implemented as a MIME header that sets up the remaining parts of the message for processing by the recipient. In the MIME implementation, message part 202 contains the following pieces of information:

TABLE 1

| MIME Header | Definition |
| --- | --- |
| MIME-Version | 1.0 |
| Content-Type | Multipart/Related - the whole message will be made up of multiple pieces of content which will be separated by the defined boundary sequence. |
| Type | Application/xop + xml - this defines the format of the overall MIME message. |
| Boundary | Application specific - this sequence will occur between each part of the multipart message. This sequence should be random enough to be sure not to occur in any of the data sections. |
| Start | ID of the first multipart section in the message. |
| StartInfo | application/soap + xml - this defines the content type of the first multipart section in the message. |

Hence, using the definitions given above, the "Content-Type" corresponds to the message structure indicated in FIG. 2, the "Type" corresponds to the message format indicated in FIG. 2, the "Boundary" corresponds to the part delimiter indicated in FIG. 2, the "Start" corresponds to the starting Content ID indicated in FIG. 2, and the "StartInfo" corresponds to the content type of the starting section of the message.

Following the MIME header, each part of the MIME message (i.e. parts 204 and 206) starts with an occurrence of the boundary sequence (i.e. part delimiter 208 in FIG. 2), followed by three headers that contain the following information:

TABLE 2

| Multipart Header | Definition |
| --- | --- |
| Content-Type | Part specific - this specifies the data type of the current part of the multipart message. Examples of this field are text/xml for XML data, application/octet-stream for a stream of binary data |
| Content-Transfer-Encoding | Content-Type specific - the definition of this field depends on the content-type for the current message part. For most ASCII content this field will be either 8bit or 16bit. For most forms of binary data, this field will be binary. |
| Content-ID | Application specific - this is the ID by which this message part can be referenced. It is the ID used in the XOP data representation for an inline data block, or the ID referenced by the MIME header if this is the first message part. |

Following the message part headers will be the data for the current message part. The data will be of whatever type is defined in the header. In the FIG. 2 example, each of the above Multipart headers individual maps directly to each of the portions of message parts 204, 206 respectively. In addition, in the FIG. 2 example, the data that follows the Multipart headers corresponds to the XML Data with Content ID (for part 204) and Binary Data (for part 206).

Figure 3:
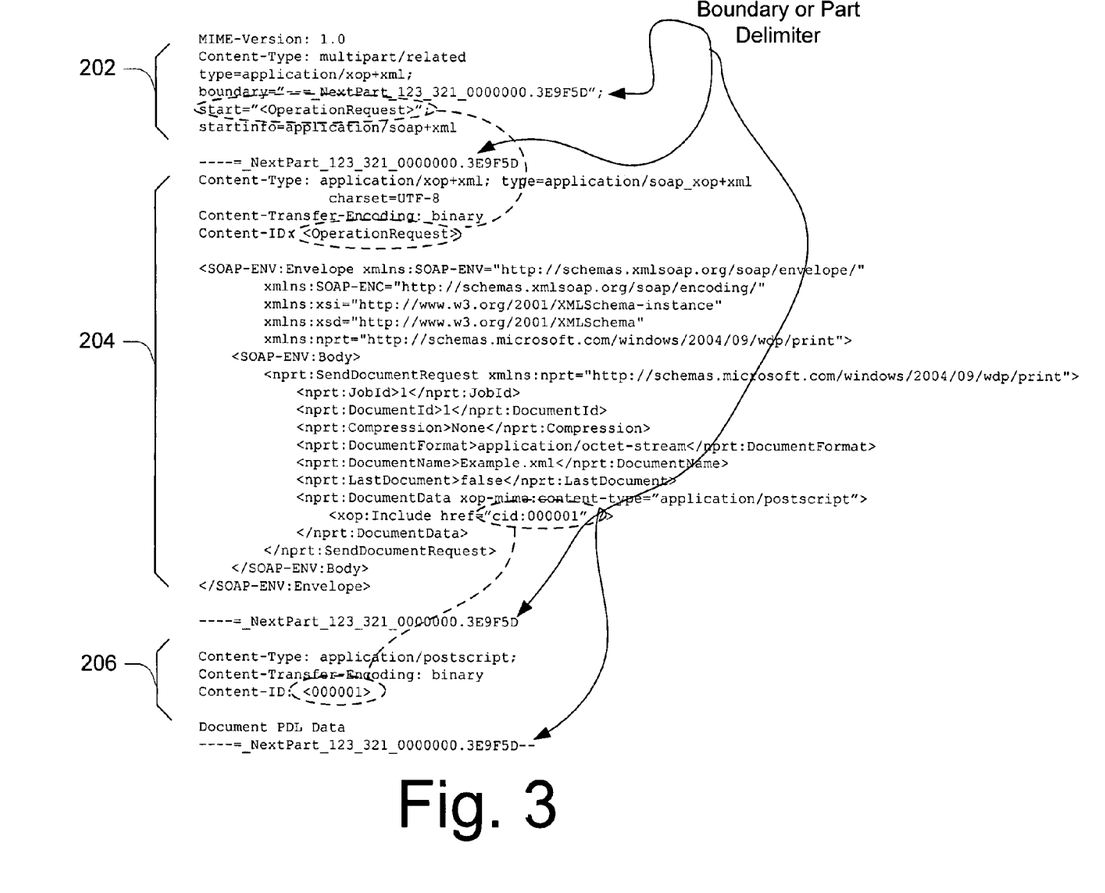
FIG. 3 illustrates an exemplary message in accordance with one embodiment.

As an example of how these techniques can be employed, consider FIG. 3. There, a message request contains binary data in the form of a document's page description language (PDL). In this example, this type of message is built or assembled by a client device, such as a computing device, and sent to a device such as a printer. In this example, the individual parts of the FIG. 2 message have been mapped to the current message in the MIME context. Specifically, first part 202 contains the information illustrated in FIG. 2, as defined in Table 1 above. Likewise, parts 204 and 206 contain the information illustrated in their corresponding parts in FIG. 2, as defined in Table 2 above.

Looking more closely at the FIG. 3 message, notice first that part 202 indicates the message is a MIME Multipart/Related message. In addition, the format of the overall message is defined as "application/xop+xml". This indicates that format uses the XML-binary Optimized Packing (XOP) convention, as will be appreciated by the skilled artisan. In addition, part 202 defines the boundaries or part delimiters as the string:

"--=_NextPart_123_321_0000000.3E9F5D".

Further, message part 202 provides the starting Content ID (encircled with the dashed line) for the next message part. Lastly, message part 202 provides the content type of the first message part.

Continuing down through the message, the first part delimiter is encountered and, thereafter, the headers of message part 204 are encountered. In this example, message part headers specify that the data in this part is application/xop+xml and provide the starting Content ID (encircled with the dashed line). Thereafter, the message part contains XML in the form of a SOAP envelope. As will be appreciated by the skilled artisan, SOAP is a lightweight protocol intended for exchanging structured information in a decentralized, distributed environment. SOAP uses XML technologies to define an extensible messaging framework providing a message construct that can be exchanged over a variety of underlying protocols. In the present example, and in the context of the printing environment, the body of the SOAP envelope (indicated by the "<SOAP-ENV:Body>" tag), contains various parameters and other information or instructions for processing the binary data that the message contains. In this particular example, such information includes the job ID, document ID, the compression that was used, the document format, document name, whether the document is the last document, and an indication of the content type of the binary data (in this case, "application/postscript"). In addition, message part 204 contains a Content ID (encircled with a dashed line) that indicates the next message part.

Continuing down through the message, the next part delimiter is encountered and, thereafter, the headers of message part 206. Following the headers and the starting part ID, the binary data can be found. In this particular example, the binary data comprises document PDL data. Following this, a part delimiter indicates the end of the message.

FIG. 4 illustrates a typical response that might be returned to the sending device after the FIG. 3 message is received and processed. In the FIG. 4 example, the response does not contain any binary data.

Figure 6:
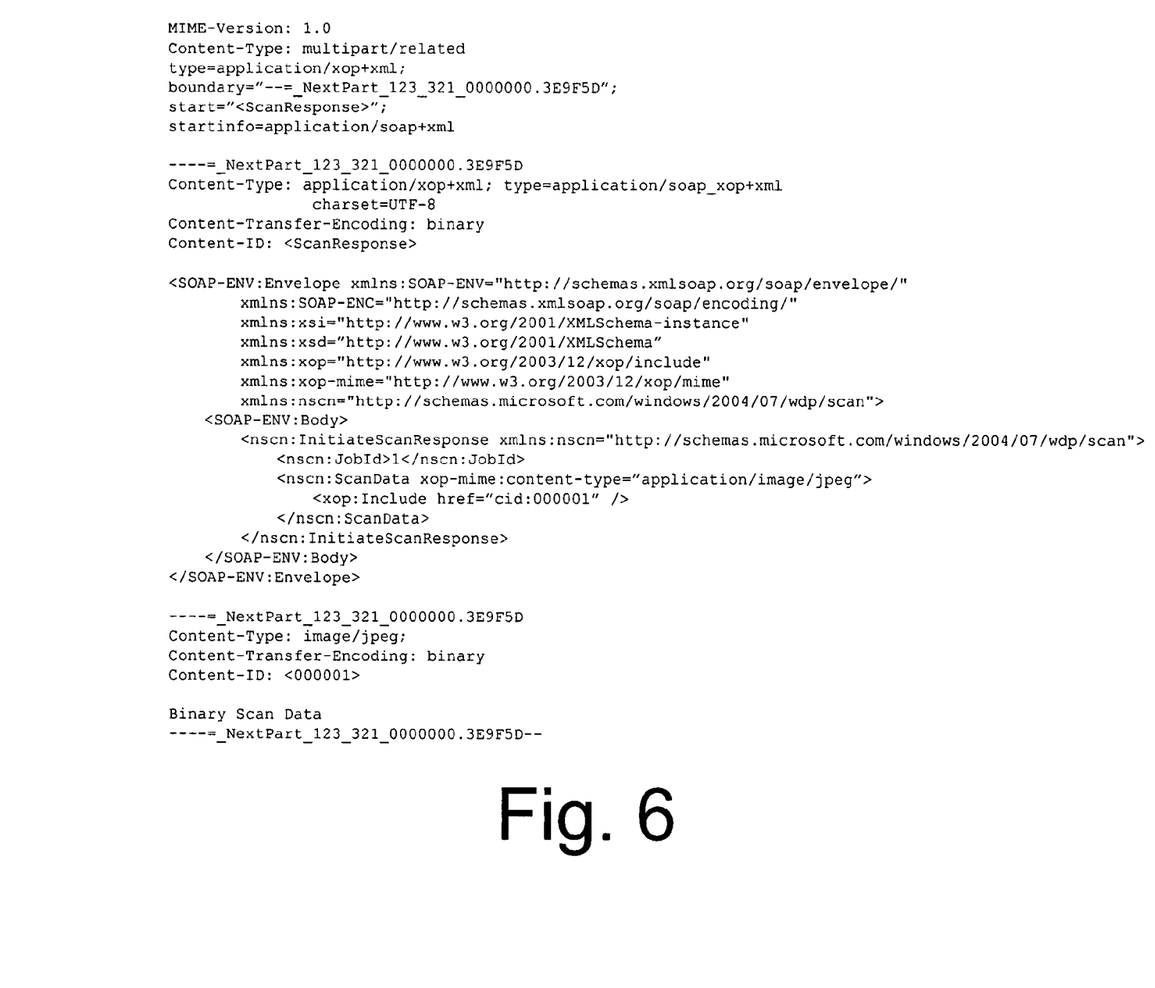
FIG. 6 illustrates an exemplary response in accordance with one embodiment.

Consider now the examples of FIGS. 5 and 6. Here, a sample message request (FIG. 5) initiates a scan request. The scan request does not contain binary data. Responsive to receiving this request, the receiving device processes the XML operation and then formats an HTTP response (FIG. 6) using the MIME Multipart/Related syntax to provide a MIME part with XML data that references the binary data (i.e. the binary scan data) that is available in the second MIME part.

Figure 7:
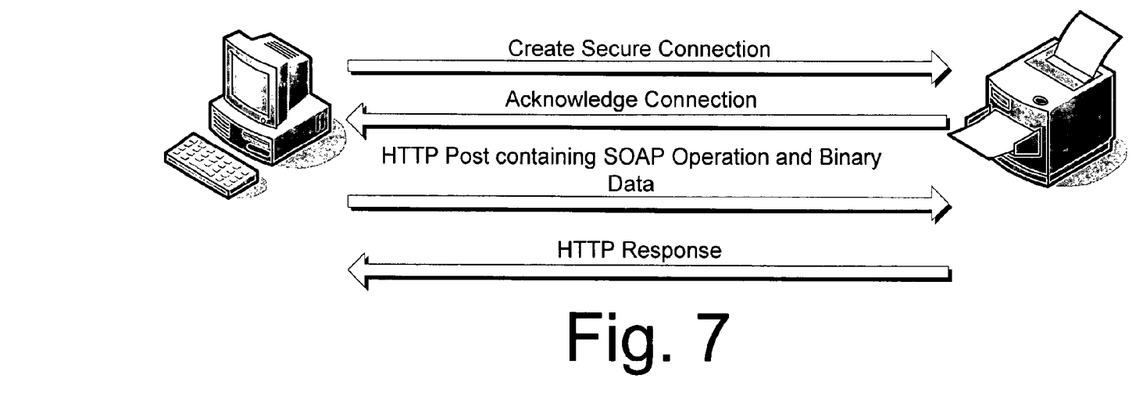
FIG. 7 illustrates one scenario in which the inventive principles can be implemented.
Figure 8:
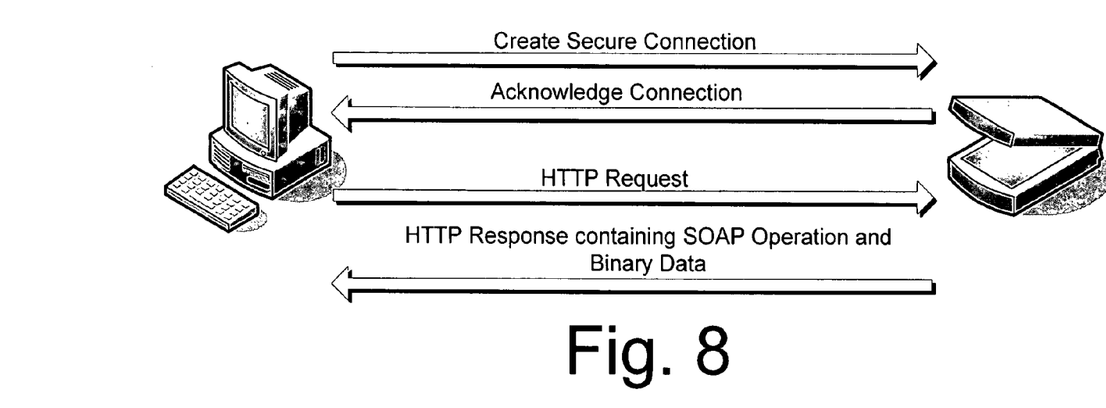
FIG. 8 illustrates another scenario in which the inventive principles can be implemented.

Consider now FIGS. 7 and 8 which illustrate two different scenarios in which the above-described message paradigm can be employed. In the scenario of FIG. 7, a client device establishes a secure connection with a printing device, which is then acknowledged by the printing device. Following this, the client device sends the printing device a message such as that described in FIG. 3. Specifically, in this example, the message is in the form of a HTTP Post containing the SOAP Operation and binary data. After receiving the message, the printing device sends an HTTP response to the client device, such as the response of FIG. 4.

Consider now the scenario of FIG. 8. There, the client device creates a secure connection with a scanning device, which the scanning device subsequently acknowledges. Next, the client device generates an HTTP request for the scanner, such as the request described in FIG. 5. Responsively, the scanner builds an HTTP response, such as the response of FIG. 6, which contains the SOAP Operation and binary data.

Thus, in the examples just described, a new device protocol incorporates XML data with binary data. The protocol can have one or more operations that combine the two types of data. These operations are sent from a client to an appropriate device using an HTTP Post. This HTTP Post has data formatted in a MIME Multipart/related content-type, whose first part (after the initial MIME headers) comprises a SOAP envelope. This SOAP envelope or object contains headers describing the operation and a SOAP Body containing the formal XML definition of the operation. The XML data can contain attributes, arguments, and a reference to the binary data. In the embodiment described above, the reference to the binary data occurs in the form of an XML-binary Optimized Packaging (XOP) convention. This reference informs the receiving device message parser that the binary data that would normally be added inline in the operation will actually follow the XML section in the MIME package. Once the XML section of the MIME data is complete, a multipart boundary marker indicates the beginning of the binary data which follows in its original form. The receiving device then processes the XML data part of the HTTP Post and reads in the binary data as separate actions. The MIME definition allows the device to understand which part will be ASCII data and which part will be binary data and act accordingly as the data is pulled off the wire.

Exemplary Client Device

Figure 9:
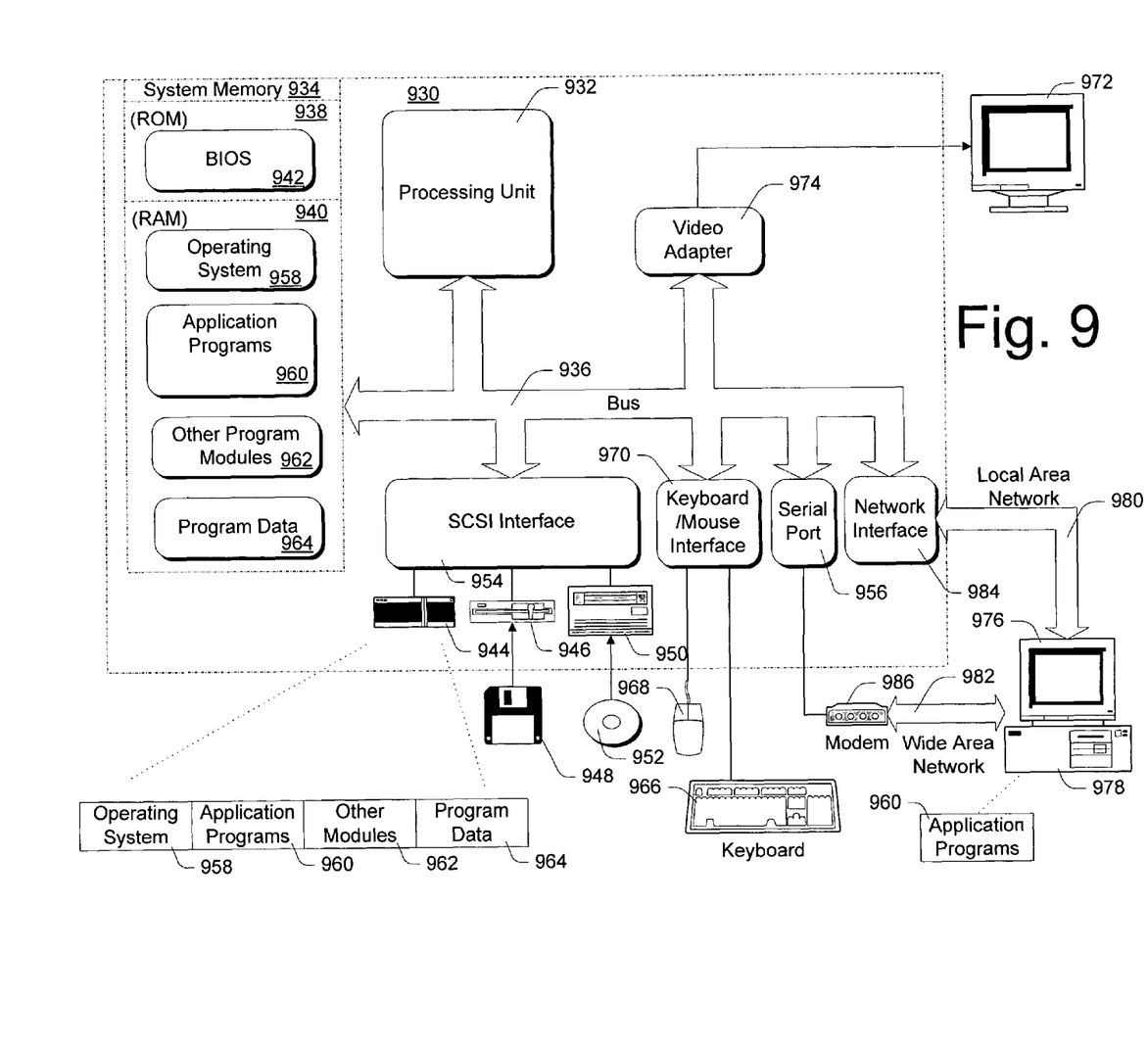
FIG. 9 illustrates an exemplary client device that can be used in connection with one or more embodiments.

FIG. 9 shows an exemplary computer system having components that can be used to implement one or more of the embodiments described above.

Computer system 930 includes one or more processors or processing units 932, a system memory 934, and a bus 936 that couples various system components including the system memory 934 to processors 932. The bus 936 represents one or more of any of several types of bus structures, including a memory bus or memory controller, a peripheral bus, an accelerated graphics port, and a processor or local bus using any of a variety of bus architectures. The system memory 934 includes read only memory (ROM) 938 and random access memory (RAM) 940. A basic input/output system (BIOS) 942, containing the basic routines that help to transfer information between elements within computer 930, such as during start-up, is stored in ROM 938.

Computer 930 further includes a hard disk drive 944 for reading from and writing to a hard disk (not shown), a magnetic disk drive 946 for reading from and writing to a removable magnetic disk 948, and an optical disk drive 950 for reading from or writing to a removable optical disk 952 such as a CD ROM or other optical media. The hard disk drive 944, magnetic disk drive 946, and optical disk drive 950 are connected to the bus 936 by an SCSI interface 954 or some other appropriate interface. The drives and their associated computer-readable media provide nonvolatile storage of computer-readable instructions, data structures, program modules and other data for computer 930. Although the exemplary environment described herein employs a hard disk, a removable magnetic disk 148 and a removable optical disk 152, it should be appreciated by those skilled in the art that other types of computer-readable media which can store data that is accessible by a computer, such as magnetic cassettes, flash memory cards, digital video disks, random access memories (RAMs), read only memories (ROMs), and the like, may also be used in the exemplary operating environment.

A number of program modules may be stored on the hard disk 944, magnetic disk 948, optical disk 952, ROM 938, or RAM 940, including an operating system 958, one or more application programs 960, other program modules 962, and program data 964. A user may enter commands and information into computer 930 through input devices such as a keyboard 966 and a pointing device 968. Other input devices (not shown) may include a microphone, joystick, game pad, satellite dish, scanner, or the like. These and other input devices are connected to the processing unit 932 through an interface 970 that is coupled to the bus 936. A monitor 972 or other type of display device is also connected to the bus 936 via an interface, such as a video adapter 974. In addition to the monitor, personal computers typically include other peripheral output devices (not shown) such as speakers and printers.

Computer 930 commonly operates in a networked environment using logical connections to one or more remote computers, such as a remote computer 976. The remote computer 976 may be another personal computer, a server, a router, a network PC, a peer device or other common network node, and typically includes many or all of the elements described above relative to computer 930, although only a memory storage device 978 has been illustrated in FIG. 9. The logical connections depicted in FIG. 9 include a local area network (LAN) 980 and a wide area network (WAN) 982. Such networking environments are commonplace in offices, enterprise-wide computer networks, intranets, and the Internet.

When used in a LAN networking environment, computer 930 is connected to the local network 980 through a network interface or adapter 984. When used in a WAN networking environment, computer 930 typically includes a modem 986 or other means for establishing communications over the wide area network 982, such as the Internet. The modem 986, which may be internal or external, is connected to the bus 936 via a serial port interface 956. In a networked environment, program modules depicted relative to the personal computer 930, or portions thereof, may be stored in the remote memory storage device. It will be appreciated that the network connections shown are exemplary and other means of establishing a communications link between the computers may be used.

Generally, the data processors of computer 930 are programmed by means of instructions stored at different times in the various computer-readable storage media of the computer. Programs and operating systems are typically distributed, for example, on floppy disks or CD-ROMs. From there, they are installed or loaded into the secondary memory of a computer. At execution, they are loaded at least partially into the computer's primary electronic memory. The invention described herein includes these and other various types of computer-readable storage media when such media contain instructions or programs for implementing the steps described below in conjunction with a microprocessor or other data processor. The invention also includes the computer itself when programmed according to the methods and techniques described below.

For purposes of illustration, programs and other executable program components such as the operating system are illustrated herein as discrete blocks, although it is recognized that such programs and components reside at various times in different storage components of the computer, and are executed by the data processor(s) of the computer.

CONCLUSION

The inventive data model described above enables non-binary XML arguments and attributes to be easily combined with large amounts of binary data, and for the whole message or package to be sent efficiently over a network to a network device. The inventive data model can also remove the need for multiple HTTP connections and can thereby eliminate the need to set up more than one secured connection from a client to the receiving device. In addition, the data model can greatly reduce the complexity of the client and device software/firmware.

Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

The invention claimed is:

1. A method comprising:
    building, by a computing system configured to transfer binary data, a multi-part message that contains binary data, wherein the building is performed by one or more processors in a transmission device, wherein the multi-part message contains:
        a first part comprising a MIME header that contains information that describes the structure and format of the multi-part message, message part delimiters that are used to delimit individual parts of the message, and a starting Content ID of a next message part;
        a second part that contains at least the starting Content ID referenced by the first part and XML data that provides contextual information that pertains to the binary data, and provides information that describes a Content ID of another next message part, wherein:
            the XML data includes additional contextual information selected from a group, the group comprising:
                a reference to the binary data;
                instructions that pertain to how the binary data is to be processed, the instructions selected from a group comprising:
                    job identifier;
                    job originating user name;
                    job transfer mode;
                    document identifier;
                    binary data compression type;
                    document format; and
                    last document indicator; and
                information that pertains to how the binary data has been processed, the information selected from a group comprising:
                    job identifier;
                    job originating user name;
                    job transfer mode;
                    document identifier;
                    binary data compression type;
                    document format; and
                    last document indicator;
            the reference to the binary data is in the form of an XML-binary Optimized Packaging (XOP) convention; and
            the reference informs a receiving device that the binary data to be added inline in an operation follows the XML data;
        at least a third part that contains at least the Content ID referenced by the second part and the binary data, wherein the binary data comprises binary data in its original form; and
    transmitting the message to the receiving device.

2. The method of claim 1, wherein the receiving device comprises a printing device, and the act of transmitting comprises transmitting binary printer data and the instructions that pertain to how the binary printer data is to be processed.

3. The method of claim 1, wherein the receiving device comprises a client device, and the act of transmitting comprises transmitting binary scanner data and the information that pertains to how the binary scanner data has been processed.

4. The method of claim 1, wherein the second and third parts contain information that specifies the content or data type of the individual part and transfer encoding associated with the individual part.

5. The method of claim 1, wherein the second and third parts contain information that specifies the content or data type of the individual part and transfer encoding associated with the individual part, and wherein the content or data type of the second part is application/XOP+XML, and the content or data type of the third part is application/octet-stream.

6. The method of claim 1, wherein the second and third parts contain information that specifies the content or data type of the individual part and transfer encoding associated with the individual part, and wherein the information in the second part describes a starting point of the next message part and comprises an XOP data representation.

7. The method of claim 1, wherein the multi-part message is implemented as a MIME Multipart/Related message.

8. The method of claim 1, wherein the XML data in the second part comprises at least one SOAP envelope.

9. The method of claim 1, wherein the contextual information comprises parameters that can be used to process the binary data that comprises binary printer or scanner data.

10. The method of claim 1, wherein the act of transmitting comprises using HTTP to transmit the message.

11. A method comprising:
building, by a computing system configured to transfer binary data, a MIME header for a message that is to contain binary data, wherein the building is performed by one or more processors in a transmission device, the MIME header:
specifying that the message is a multipart/related type;
specifying that the message's format uses XOP and XML data representations;
specifying a boundary that is to be used between different message parts; and
providing a starting Content ID for a message part after the MIME header;
building, by the computing system, multiple additional message parts that follow the MIME header, individual additional message parts being selected from a group, the group comprising:
instructions that pertain to how the binary data is to be processed;
information that pertains to how the binary data has been processed by a scanner;
a content type specification that specifies an individual additional message part's content type; and
a content ID by which an individual additional message part is referenced, wherein a content ID in at least one of the additional message parts specifies an XML-binary Optimized Packaging (XOP) data representation that references the binary data, the binary data being included in the message inline;
providing, by the computing system, binary data that is to be included in the message, wherein the binary data comprises binary data in an original form; and
building, by the computing system, the message by assembling the MIME header, additional message parts and the binary data, the computing system being selected from a group comprising a computer and a scanner.

12. The method of claim 11, wherein the act of building the multiple additional message parts further comprises specifying, by the computing system, content transfer encoding for the additional parts, wherein a content transfer encoding is selected from a group comprising binary.

13. The method of claim 11, wherein the act of building the multiple additional message parts comprises specifying, by the computing system, at least one content ID as an XOP data representation that is embedded within a SOAP envelope.

14. The method of claim 11, wherein the act of building multiple additional message parts comprises specifying, by the computing system, at least one content type specification as application/XOP+XML.

15. The method of claim 11, wherein the act of building multiple additional message parts comprises specifying, by the computing system, at least one content type specification as application/XOP+XML, wherein said application/XOP+XML content type comprises a SOAP envelope which includes context information that pertains to the binary data, and an XOP data representation that contains an ID for the binary data.

16. The method of claim 11, wherein the act of building multiple additional message parts comprises specifying, by the computing system, at least one content type specification as a stream of binary data.

17. The method of claim 11 further comprising using, by the computing system, HTTP as a transport protocol to transmit the message to a receiving device.

18. The method of claim 11 further comprising:
setting up, by the computing system, a single HTTP connection between a transmitting device that is to transmit the message and a receiving device that is to receive the message; and
using, by the computing system, the single HTTP connection to transmit the message.

19. The method of claim 11, wherein the act of building the message is performed by at least one of a printer or a scanner.

20. A computer-readable storage media having instructions stored thereon that, when executed by at least one processor, perform acts comprising:
building a multi-part message that comprises:
binary data in its original binary form, the binary data selected from a group comprising binary printer data and binary scanner data;
a first part comprising a MIME header that contains information that describes the structure and format of the multi-part message and a starting Content ID of a next message part;
message part delimiters that are used to delimit individual parts of the message;
a second part that contains at least the starting Content ID referenced by the first part and XML data that provides contextual information that pertains to the binary data, and provides information that describes a Content ID of another message part, wherein:
the XML data includes additional contextual information selected from a group, the group comprising:
instructions that pertain to how the binary data is to be processed; and
information that pertains to how the binary data has been processed;
the reference to the binary data is in the form of an XML-binary Optimized Packaging (XOP) convention; and
the reference informs a receiving device that the binary data to be added inline in an operation follows the XML data; and
a third part that contains at least the Content ID referenced by the second part and the binary data, the Content ID comprising a numerical Content ID; and
transmitting, by a transmitting device, the message to the receiving device, the transmitting device selected from a group comprising a client computer device and a scanning device, the receiving device selected from a group comprising a client computer device and a printing device.

* * * * *